United States Patent Office 3,513,240
Patented May 19, 1970

3,513,240
CONTROLLING BEETLES WITH 3,5-DIMETHYL-4-DIMETHYLAMINOMETHYLPHENYL - N - METHYLCARBAMATE
Hendricus Bernardus Antonius Welle, Utrecht, and Jacques Meltzer, Van Houtenlaan, Weesp, Netherlands, assignors, by mesne assignments, to U.S. Philips Corporation, New York, N.Y., a corporation of Delaware
No Drawing. Original application July 15, 1965, Ser. No. 472,320, now Patent No. 3,388,151, dated June 11, 1968. Divided and this application Oct. 9, 1967, Ser. No. 719,798
Claims priority, application Netherlands, July 17, 1964, 6408165
Int. Cl. A01n 9/00, 17/00, 17/08
U.S. Cl. 424—300                                    1 Claim

ABSTRACT OF THE DISCLOSURE

Method of combatting beetles with 3,5-dimethyl-4-dimethylaminomethylphenyl-N-methylcarbamate.

This application is a division of our copending application Ser. No. 472,320, filed July 15, 1965, and now U.S. Pat. No. 3,388,151.

The invention relates to a new compound of Formula I

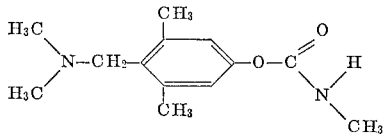

to agents for the control of noxious organisms which agents contain this new substance as the active constituent, and to a new method for the combatment of noxious organisms which uses these compositions.

It was found that the above compound has an insecticidal and a nematocidal activity. In particular, this compound was found to have a surprisingly strong activity on beetles.

The new compound according to the invention may be prepared according to methods which are known for the preparation of this type of compounds and according to methods analogous thereto.

For example, the compound of Formula II,

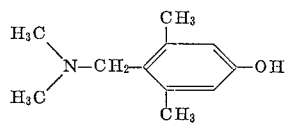

is used as the starting material and is caused to react with methylisocyanate or with monomethyl carbamic acid chloride under the conditions well known for this type of reaction. The nematocidal activity of the compound according to the invention was established inter alia in the following experiment.

Dry pea-seeds were laid in an aqueous dispersion of the substance for 24 hours, after which they were rinsed under running water for 15 minutes. The seed-coats were then removed from the seeds and incubated one by one between the seedlobes with a drop of C.M.C-suspension of *Ditylenchua dipaaci* (approximately 40 eelworms per drop). The seeds were then laid in moist soil for germination and stored at approximately 23° C. After a fortnight the extent of infestation of the seedlings, which manifests itself in an above-soil thickening of the stem and often also in leaf deformations, was evaluated.

By using various concentrations of the active substance the minimum dose at which full protection was obtained could be determined. It was found that at 62.5 p.p.m. of active substance 100% protection and at 15⅝ p.p.m. a 85% protection was achieved.

The insecticidal activity was determined inter alia in the following experiments.

Potato leaves were dipped in an aqueous dispersion of the active substance. The stems were placed in bottles which were filled with a nutrient solution. After the deposit had dried, plastic cylinders were arranged over the plants and the plants were then infected with 10 colorado potato beetle larvae (*Leptinotarea decemlineata*) third stage. The percentage mortality of the beetles in various concentrations of active substance was determined. It was found that the substance according to the invention caused 100% mortality at a concentration as low as 3 p.p.m. Seven days after treatment the plants were re-infected and still 100% mortality was obtained.

For comparison the same experiment was performed with the known insecticidal compound 3,5-dimethyl-4-dimethylaminophenyl-N-methylcarbamate and it was found that with this compound the concentration had to be raised approximately 100 times in order to achieve the same result.

A particularly strong activity of the compound according to the invention was also found against other beetles, for example, the boll weevil, the pollen beetle and the cabbage weevil.

The agents according to the invention comprise the usual application forms, in which the fungicidal substance is mixed with or dissolved in a solid or liquid carrier to which a surface-active substance or a dispersion agent or adhesive may be added, for example, dusts, smoke generators, aerosols, dispersions and emulsions. In the case of dispersions and emulsions, water is preferably used as a diluent in which, as so-called primary compositions, readily water-dispersible powders, wettable powders and water-emulsifiable oils or pastes are prepared as pesticidal agents and which are diluted with water only shortly before or during spraying.

The concentration of the active substance in the agents according to the invention may consequently vary within very wide limits, for example, from 95% by weight in a wettable powder which would contain, in addition to the active substance, only a dispersing agent, to, for example, 0.001% by weight in an aqueous liquid to be sprayed.

Dusts according to the invention are obtained by intimately mixing, for example, grinding together, the active substance of the Formula I with an inert solid carrier material, for example, in a concentration of from 1 to 50% by weight. As examples of suitable solid carriers may be mentioned talcum, kaolin, pipeclay, diatomaceous earth, dolomite, gypsum, chalk, bentonite or attapulgite and mixtures of these and similar substances. Alternatively, organic carriers, for example, ground shells of walnuts, may be used.

Wettable powders according to the invention contain the active substance of Formula I, at least one dispersing agent, for which, for example, the agents known for this purpose, such as lignine sulphonates, alkylnaphtalene sulphonates, are to be considered, in addition preferably also a wetting agent, for which, for example, fatty alcohol sulphates, alkylarylsulphonates or fatty-acid condensation products, for example, those known under the trade name "Igepon" are to be considered, while in addition preferably an inert solid carrier is added to such a mixture. For example, a wettable powder is obtained by mixing the active substance with 1 to 5 parts by weight of a disperating agent, 1–5 parts by weight of a wetting agent and 10–80 parts by weight of one of the above solid inert carriers. For the preparation of miscible oils the active compound is dissolved or finely divided in a suitable solvent which preferably is poorly soluble in water and to this solution is added an emulsifier. Suitable solvents are, for example, xylene, toluene, petroleum distillates, which are rich in aromates, for example, solvent naphtha, distilled tar oil and mixtures of these liquids. As emulsifiers may be used, for example, alkylphenoxylpolyglycol ethers, polyoxyethylene sorbiton esters of fatty acids or polyoxyethylene sorbitol esters of fatty acids. The concentration of the active compound in these miscible oils is not restricted to narrow limits and may vary, for example, between 2 and 50% by weight. In addition to these wettable powders and miscible oils may be mentioned as highly concentrated primary composition a solution of the active substance in a readily water miscible liquid, for example, acetone, to which solution a dispersing agent and, if desired, a wetting agent is added. When diluted with water shortly before or during spraying, an aqueous dispersion of the active substance is formed.

The atomization and the spraying of the agents according to the invention is carried out in the usual maner in a suitable concentration, which is not restricted to narrow limits and may lie, for example, between 0.01 and 5 and as a rule between 0.01 and 0.5% by weight.

An aerosol preparation according to the invention is obtained in the usual manner by incorporating the active substance, if desired in a solvent, in a volatile liquid to be used as a propellant, for example, the mixture of chloro-fluoro derivates of methane and ethane, commercially available under the trade name "Freon."

Smoke generators, i.e. preparations which develop a fungicidal smoke during burning, are obtained by incorporating the active substance of Formula I in a combustible mixture which contains, for example, a sugar or wood as a fuel preferably in a ground form, a substance to maintain combustion, for example, ammonium nitrate or potassium chlorate, and further a substance to delay combustion, for example, kaolin, bentanite and/or colloidal silicic acid.

In addition to the above ingredients, the agents according to the invention may also contain other substances known for use in this type of agent.

For example, a lubricant, such as calcium stearate or magnesium stearate may be added to a dust. Alternatively, for example, "adhesives" such as polyvinyl alcohol cellulose derivatives, or other colloidal materials, such as casein, may be added in order to improve the adherence of the pestidical agents to the surface to be protected.

In order that the invention may readily be carried into effect it will now be described in greater detail with reference to the ensuing specific examples.

EXAMPLE 1

Preparation of the active substance:

To a solution of 36 g. of 3,5-dimethyl-4-dimethylaminomethylphenol in 100 ml. of dry diethylether were added a few drops of triethylamine and 12.5 g. of methylisocyanate. The mixture was stored at room temperature for 24 hours. The ether was then removed by distillation and the residue recrystallized from petroleum ether (60–80°).

Obtained were 42 g. of 3,5-dimethyl-4-dimethylaminomethylphenyl-N-methylcarbamate (Formula I) of melting point 94–95° C.

The starting substance of Example 1, 3,5-dimethyl-4-dimethylaminomethylphenol, was obtained as follows:

A solution of 68 g. of 3,5-dimethylanisol in 125 ml. of benzene and 125 ml. of concentrated hydrochloric acid was saturated with gaseous HCl at 5° C. Within two hours and whilst stirring vigorously, a solution of 15 g. of paraformaldehyde in 225 ml. of concentrated hydrochloric acid was then added dropwise. During the addition the temperature was kept at +4 to +8° C. while a weak current of HCl-gas was led through. After the addition, stirring was continued for another hour at approximately 8°, after which 100 ml. of benzene and 200 g. of ice were added to the reaction mixture. The organic layer was separated and washed 3 times with 100 ml. of cold water. The benzene layer was dried on $Na_2SO_4$ and then filtered. The filtrate was added to a solution of 50 g. of dimethylamine in 250 ml. of benzene. After the mixture had been left to stand at room temperature for 24 hours it was heated at 40–50° C. for three hours. Then the excess of dimethylamine and a great part of the benzene were distilled off at normal pressure. 250 ml. of benzene were added to the residue, after which the base was extracted with 4 N hydrochloric acid. The water layer was separated and then rendered strongly alkaline with a concentrated NaOH-solution. The base was extracted with ether. The ether solution was dried on $Na_2SO_4$ after which the solvent was distilled off. The residue was distilled at reduced pressure. Yield 42% of the theoretically possible quantity. Boiling range 133–140° C./12–13 mm. Hg. 27 g. of 3,5-dimethyl-4-dimethylaminomethyl-anisol in 110 ml. of 48% HBr were refluxed for 10 hours. The solution was evaporated to dryness in vacuo after which 50 ml. of water were added. The solution was rendered strongly alkaline by the addition of 60 ml. of 4 N NaOH. The solution was then extracted two times with 100 ml. of ether.

The aqueous solution was then continuously extracted with ether. Evaporation of this ether extract and crystallization of the residue from benzene-petroleum ether 1:1 yielded 15 g. of 3,5-dimethyl-4- dimethyl-aminomethylphenol with melting point 105–107° C.

Examples of agents which contain the compound according to Example 1 as the active substance are:

EXAMPLE 2

25 parts by weight of active substance, 40 parts by weight of attaclay, 25 parts by weight of keolin, 7 parts by weight of Polyfon H (West Virginia Cy) and, 3 parts by weight of sodium oleyl N-mathylaurate were ground in a mill to form a wettable powder.

EXAMPLE 3

A water-miscible oil is obtained by incorporating 25 parts by weight of the active substance together with 5 parts by weight of a mixture (1:1) of alkylphenol polyglycol ether and calcium dodecyl benzene sulphonate in 70 parts by weight of xylene.

EXAMPLE 4

A smoke generator is composed containing:

|   | G. |
|---|---|
| Active substance | 16 |
| Sandal wood | 15 |
| Wood dust | 12 |
| Colloidal silicic acid | 3 |
| Bentonite | 4 |
| Ammonium nitrate | 40 |

EXAMPLE 5

For an aerosol preparation 10 g. of the active substance are dissolved in 20 ml. of methylene chloride and incorporated in 80 g. of Freon.

EXAMPLE 6

A dust formulation is prepared by grinding 3 g. of the active substance C together with 10 g. of attaclay and 87 g. of talcum.

Variations both in the composition of the agents and in their use are known in the field of the combatment of moulds and it is also known that it is possible to state absolute limits for the quantities of fungicides which could be used in all circumstances.

In general it may be said that, when using 0.02 to 10 g. of active substance per $m.^2$ a sufficient effect is reached. When spraying plants a quantity of from 0,2 to 8 kg. per ha. will in general be sufficient,

What is claimed is:

1. A method of controlling beetles, said method comprising contacting said beetles with an amount toxic to said beetles of 3,5 - dimethyl - 4 - dimethylaminomethylphenyl-N-methylcarbamate.

References Cited

UNITED STATES PATENTS 3,114,673  12/1963  Lemin _____ 424—300 XR

SHEP K. ROSE, Primary Examiner